C. R. & J. Hight.
Churn Dasher.
Nº 7,490. Patented Jul. 9, 1850.
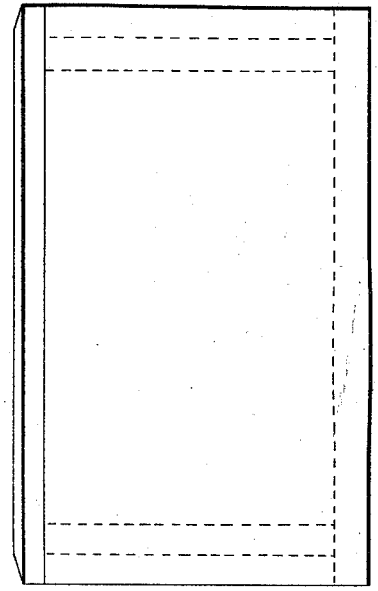
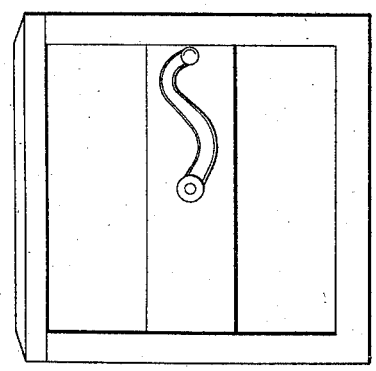
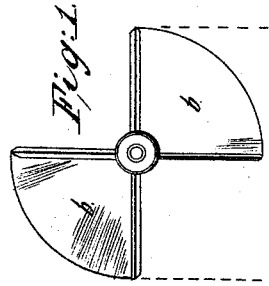
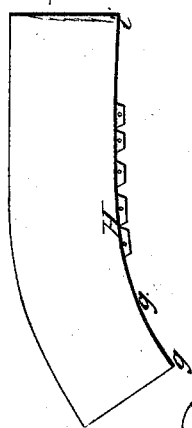
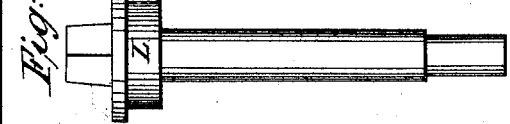
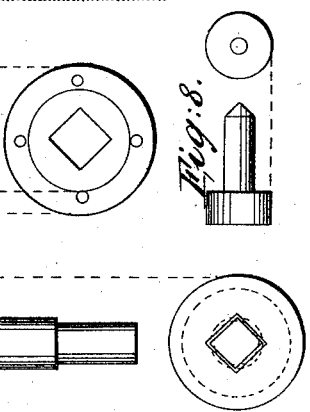
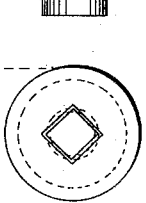
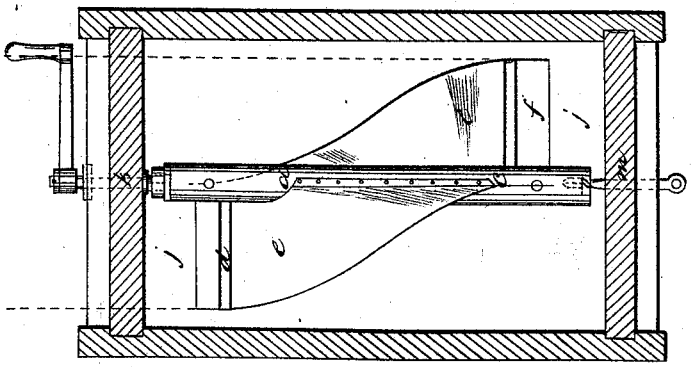

UNITED STATES PATENT OFFICE.

C. R. HIGHT AND J. HIGHT, OF GENEVA, ILLINOIS.

SPIRAL CHURN-DASHER.

Specification of Letters Patent No. 7,490, dated July 9, 1850.

*To all whom it may concern:*

Be it known that we, CORNELIUS R. HIGHT and JOHN HIGHT, of Geneva, in the county of Kane and State of Illinois, have invented a new and Improved Mode of Obtaining Butter from Cream or Milk; and we do hereby declare that the following is a full and exact description thereof, reference being had to the accompanying drawings and to the letters of reference marked thereon.

To enable others skilled in the art to make and use our invention we will proceed to describe its construction and operation.

Figure 1, in the accompanying drawings represents an open top view of churn, Fig. 2, represents an end view, Fig. 3, represents a side view, Fig. 4, represents a side view or a wing, Fig. 5, represents a side and end view of coupling gudgeon, Fig. 6, represents a side, and end view, of a socket, or coupling, attached to end of dash shaft, Fig. 7, is a side view of screw pivot, Fig. 8, represents a side and end view of a box, for pivot, Fig. 7.

The nature of our invention consists in the application of a reacting spiral revolving dash, attached to a box churn, in a horizontal position; as shown in Fig. 1, letter *a*.

Our dash of medium size, consists of a shaft, 15½ inches in length, and 1½ inches in diameter, and four arms; five inches clear of shaft; also two wings, made of wood, or tin, or any other suitable material; 12¼ 35 inches in length, and five, in width at the ends, increasing to five and a quarter in the center, as represented in Fig. 1, letter *a*. Letters *b, b*, in Fig. 1, represent an end view of the same.

The peculiar construction of the dash, consists in setting the arms to which the wings are attached, at right angles, upon opposite sides of the shaft, so as to produce a quarter twist in the wings as they extend along the shaft from one arm to the other.

The manner of attaching the wings to the arms, and shaft, is as follows. Commencing at letter *c*, in Fig. 1, the wings extend along the shaft in nearly a straight line to letter *a*, being about two thirds the distance between the arms, from thence passing to the arm *d*, giving an increased twist, as shown by letters *e, e*, in Fig. 1. The ends and twist of the opposite wing is reversed as shown by letters *e* and *f* in Fig. 1.

Fig. 4 represents a wing before twisted or attached to the arm. The inner border of which is curved, and describes from letter *g* to *g*, the segment of a 16 inch circle, and from letter *g* to letter H, the segment of a 23 inch circle, and from thence to letter *i*, becomes nearly straight. The outside border agreeing with the inside, except a gradual swell to the center, of 1 fourth of an inch. We attach the wings to the arms, by splitting the same with a saw, and setting in the wings, and fastening them with brads or small screws. The construction of the dash is such as to produce in its revolution opposite currents, in the cream, or milk, thereby producing butter in from 5 to 8 minutes with the greatest ease to the operator, as it operates upon the reacting screw principle. In order to accumulate or collect the butter, in a mass, the revolution of the dash should be reversed, and the butter collects at the ends of the wings, for which purpose the vacancies *j j* in Fig. 1, are left.

The box of our medium sized churn is composed of inch boards locked and nailed together, so as to form a tight box, the length of which is 18 inches, in the clear, 12 in width and 13 in depth, the cover is rabbeted or cleated upon its under side so as to prevent the escape of the fluid within.

Fig. 5 is the coupling gudgeon which connects the crank to the dash, by socket or coupling, as shown in Fig. 1, letter *k*.

Letter L, Fig. 5 represents a cast box sunk in the wood through which the gudgeon passes. Fig. 6, coupling socket, connects dash shaft, and coupling gudgeon, which may be attached to the dash shaft by nails or screws.

Letter *m*, in Fig. 1, shows the office ar *l* application of screw pivot Fig. 7.

Fig. 8, is a box, or socket sunk in the end of shaft to receive the screw pivot Fig. 7, as shown in Fig. 1, letter *o*.

What we claim as our invention and desire to secure by Letters Patent, is—

The application of a reacting spiral revolving dash, the wings of which may be constructed of wood or tin, or any other suitable material, to a box churn, as described, and set forth in the above specification, and accompanying drawings, or to any of the usual forms of churns, to which it may be attached to good advantage.

CORNELIUS R. HIGHT.
JOHN HIGHT.

Witnesses:
JAMES HERRINGTON,
JOHN CLARKE.